TURBINE DRIVEN MULTI-STAGE BLOWER OR PUMP

Original Filed April 20, 1953 5 Sheets-Sheet 1

Inventor:
Alfred Buchi

TURBINE DRIVEN MULTI-STAGE BLOWER OR PUMP
Original Filed April 20, 1953 5 Sheets-Sheet 2
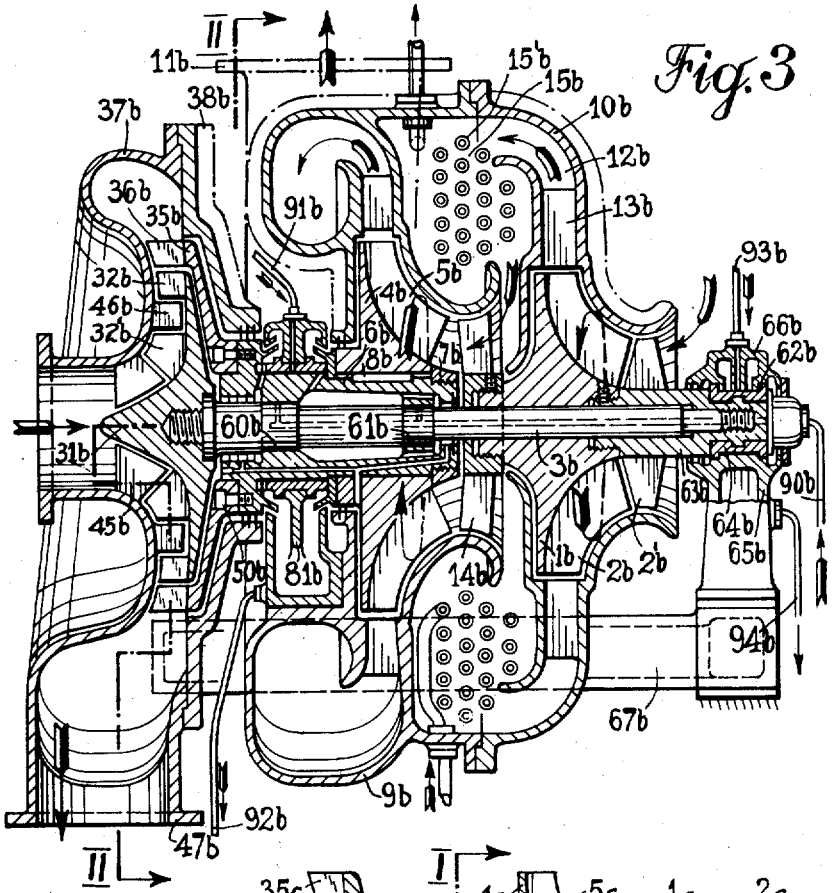
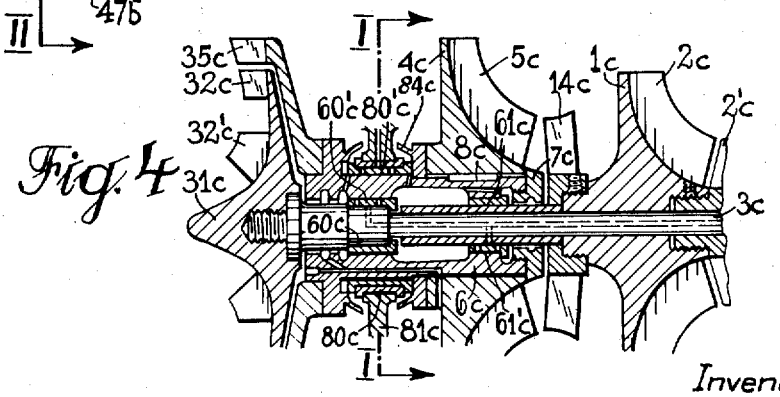
Inventor:
Alfred Buchi

TURBINE DRIVEN MULTI-STAGE BLOWER OR PUMP

Original Filed April 20, 1953 5 Sheets-Sheet 3

Inventor:
Alfred Buchi

TURBINE DRIVEN MULTI-STAGE BLOWER OR PUMP

Original Filed April 20, 1953 5 Sheets-Sheet 4

Inventor:
Alfred Buchi

TURBINE DRIVEN MULTI-STAGE BLOWER OR PUMP

Original Filed April 20, 1953 5 Sheets-Sheet 5

Inventor:
Alfred Buchi

United States Patent Office

Re. 24,810
Reissued Apr. 19, 1960

24,810

TURBINE DRIVEN MULTI-STAGE BLOWER OR PUMP

Alfred Buchi, Hurden, Switzerland

Original No. 2,842,306, dated July 8, 1958, Serial No. 349,847, April 20, 1953. Application for reissue October 20, 1958, Serial No. 768,508

Claims priority, application Switzerland April 30, 1952

14 Claims. (Cl. 230—116)

Matter enclosed in heavy brackets [ ] appears in the original patent but forms no part of this reissue specification; matter printed in italics indicates the additions made by reissue.

This invention relates to turbine driven multi-stage blowers or pumps comprising several bladed rotors.

The main constructional feature in a turbine driven multi-stage blower according to the present invention is to form the blading of two or several rotors so as to provide for at least one rotor rotation in one direction and for the other rotor or rotors for rotation in the opposite directions; the respective shafts for the oppositely rotating rotors are co-axially disposed and driven by separate turbine rotors which have mutually opposite rotary direction.

A main object of the present invention is to realize high gas pressures at relatively moderate circumferential speeds of the blower rotors, notably with a high efficiency coefficient. The gas turbine adapted to drive the co-axial shafts of the centrifugal blower is thereby also capable to operate with a high efficiency coefficient at moderate rotational speeds which is of a particular advantage in gas turbines operated by hot gas.

Other objects relating to details of constructions will become apparent from the following description in conjunction with the accompanying drawings in which.

Figure 3 shows an embodiment wherein the blower consists of a first radial impeller wheel with which is associated an axial impeller wheel in advance and an axial impeller wheel beyond; this latter transferring the operating medium to a second oppositely running radial impeller wheel. The turbine is constructed as an internal admission radial turbine. It comprises an inner radial impeller wheel on which two rotor vane rings are arranged one beyond the other, each of which cooperates with a stationary guide vane ring in front thereof. Outwardly of the inner rotor wheel there is an outer oppositely running rotor wheel also provided with radial vanes.

Figure 4 shows also in axial section a modification of the construction shown in Figure 3, of mounting the two shafts rotating one within the other.

Figure 5:
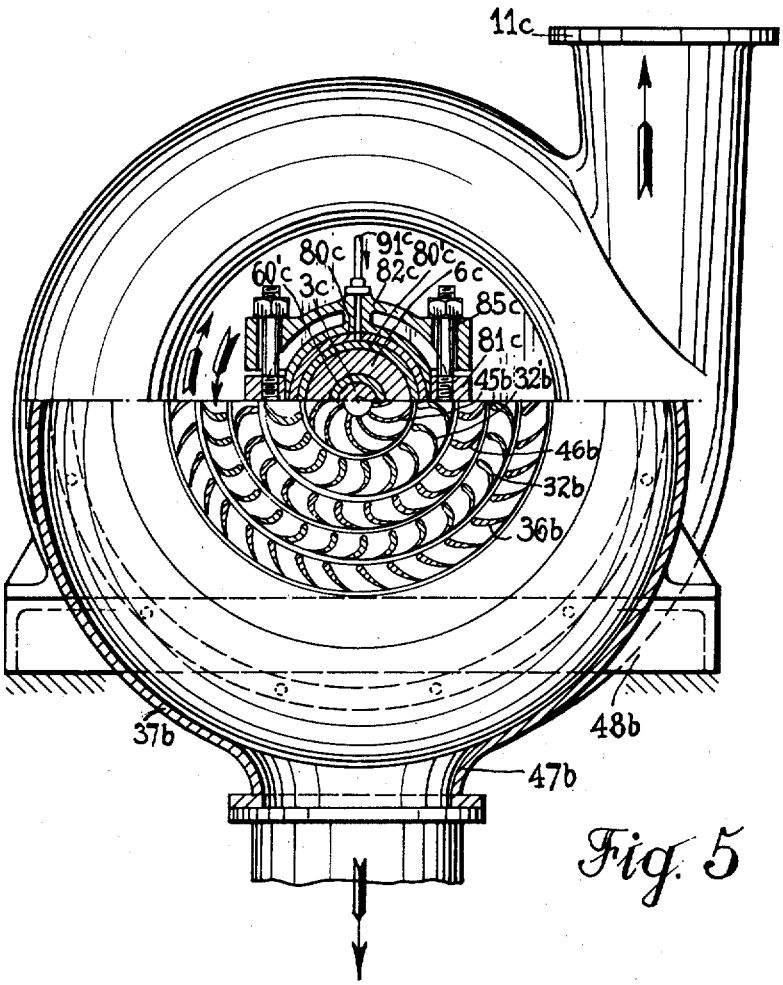

Figure 5 shows transverse sections in different planes through the arrangement according to Figure 4.

Figure 6:
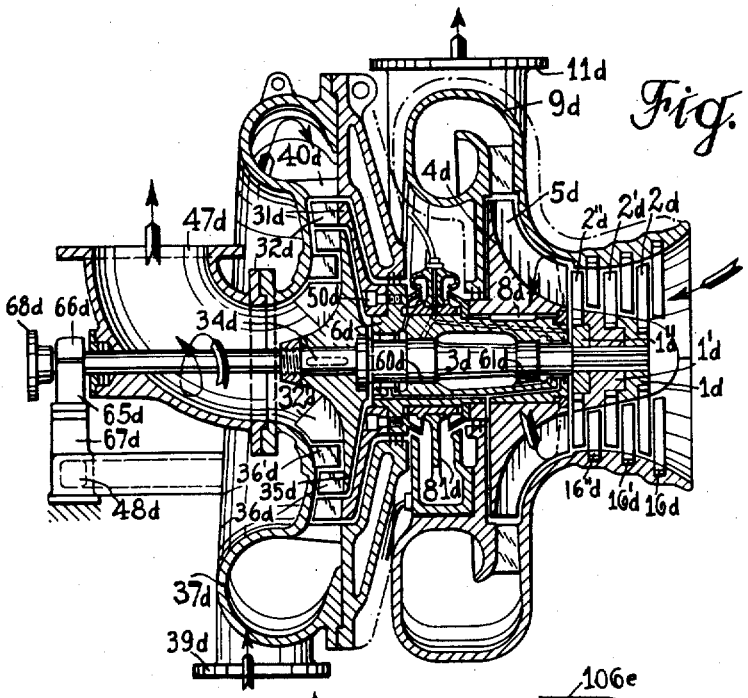

Figure 6 shows an embodiment wherein one part of the blower is formed as a multi-stage axial blower and the radial impeller wheel rotating oppositely thereto is provided with radial vanes. The turbines driving the two types of blower in opposite directions are also provided with radial vanes; the admission to the turbine is effected however from the outside.

Figure 7:
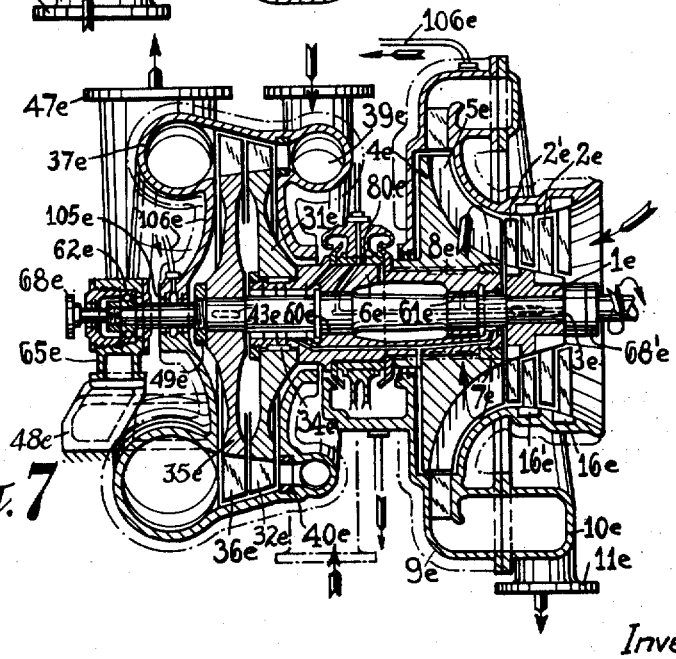

Figure 7 shows an embodiment wherein the blower rotor is similarly formed to Figure 6. The drive is effected however by two oppositely running axial turbine wheels each having one stage.

Figure 9:
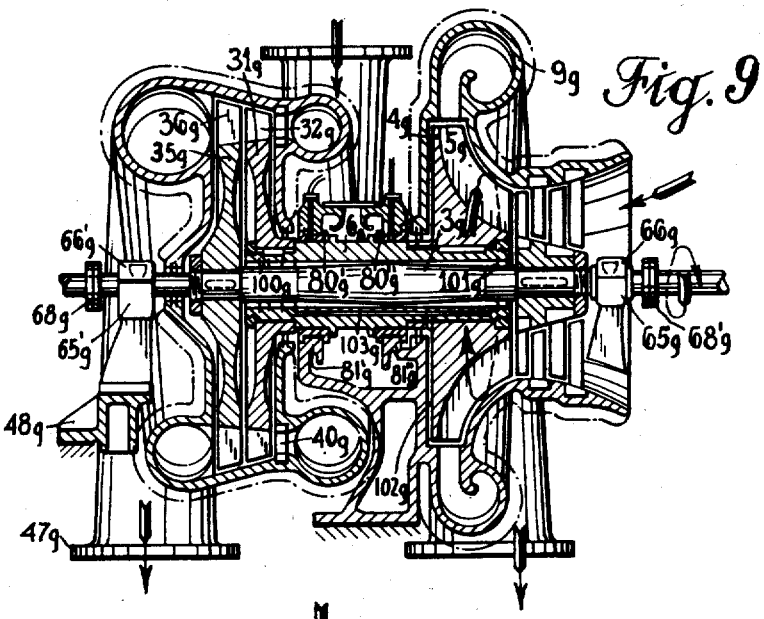
Figure 8:
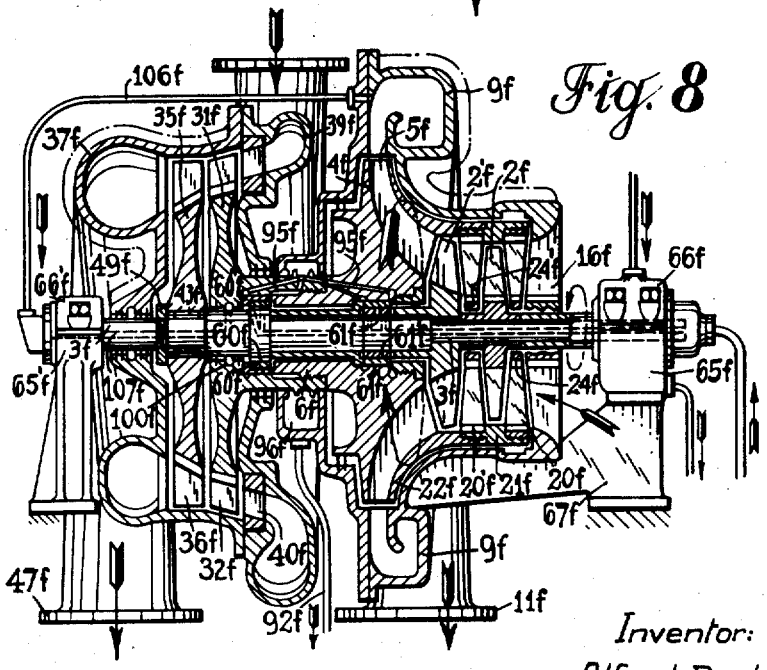

Figure 8 relates to a similar blower to Figure 7 but an oppositely running axial-radial turbine is used. The support of the oppositely running shafts is however different, and Figure 9 shows a similar blower and a similar turbine to Figure 7, but the supporting of the inner shaft is effected outwardly at both ends and the support of the outer shaft is also effected by two bearings at the center of the machine.

Figure 1:
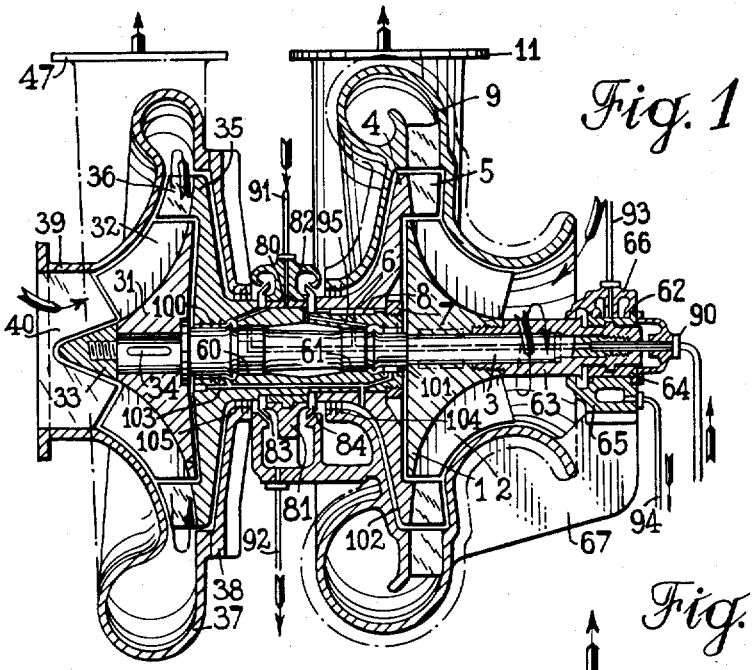
Figure 1 shows an axial section through an embodiment of the invention in which the oppositely running blower or pump consists of two oppositely running radial impeller wheels arranged one within the other and likewise the turbine consists of two radial impeller wheels arranged one within the other.

In Figure 1 the blower rotor is indicated at 1 and the radial vanes thereof are marked 2, this rotor being mounted on the inner shaft 3. 4 is the second rotor wheel of the blower having radial vanes 5. This rotor surrounds the radial vanes 2. This wheel 4 is keyed to the outer shaft 6 and is secured thereto by means of the nut 7 and the key 8. Both blower rotors are surrounded by the two-part housing 9 which comprises an outflow connection 11. The air flow passes in the direction of the arrows through the blower. 31 is an inner turbine wheel having radial vanes 32 and this wheel is secured to the inner shaft 3 by means of the nut 33 and the key 34. A second turbine wheel 35 with radial vanes 36 is also provided and the vanes 36 thereof outwardly enclose the vanes 32. Pressure medium flows in axially through the inlet connector 39. After flowing out of the radial vanes 36 the pressure medium reaches the outlet housing 37 which is closed laterally by the two-part cover 38. A guide vane system 40 may also be provided in the connector, 39.

The arrangement can however also be constructed without such a guide vane system. The turbine disc 35 can be formed integrally with the outer shaft 6. Both parts 35 and 6 can however also, as will be seen later, consist of two separable parts.

Three bearings 60, 61 and 62 are provided for supporting the inner shaft 3, the bearing points 60 and 61 being located within the outer shaft 6 and the bearing 62 which serves also as a thrust bearing is located at the free end of the inner shaft 3. At this point a sleeve 63 is screwed to the inner shaft 3 which serves simultaneously for securing the wheel disc 1. The blower wheel 1 is also screwed on to this sleeve. The two-part bearing sleeve 64 is fitted in a two-part bearing carrier 65 and 66 which is secured to the support 67 fixed to the blower housing 9.

The outer shaft 6 is secured in a two-part bearing casing 81, 82 by means of a one- or two-part bearing bush 80. Oil throw rings 83, 84 are provided on both sides of the bearing bush 80. These rings may also serve for absorbing the axial play of the wheels which are secured to the outer shaft. The lower bearing support 81 can, as stated, be formed integrally with the blower housing 9.

The introduction of lubricating oil to the inner shaft is effected through the pipeway 90 and the shaft 3 to the bearing points 60 and 61. The feed of oil to the bearing bush 80 around the outer shaft 6 is effected through the pipe-way 91, and outflow of oil from the bearings 60, 61 and 80 is effected via the throw rings 83, 84 into the bearing support 81, 82 and thence outwardly through the pipe 92. The outer bearings 62, 64 are lubricated from outside through the pipe 93 and the lubricating oil flows outwardly through the bearing body 65 and pipeway 94 to the outside. The lubricating oil from the bearings 60 and 61 flows through the bores 95 in the outer shaft 6 to the bearing 80 and thence into the bearing support 81.

Suitable labyrinth packings are provided at the various sealing points 100 and 101 between the inner and outer shafts, one of which, subject to the pressure section of the blower, receives seal-off air for example through the hollow spaces 102 and the bores 103 in the outer shaft 6. Labyrinth packings 104, 105 are also provided between the blower housing 9 or 38 and the outer shaft 6.

Figure 2:
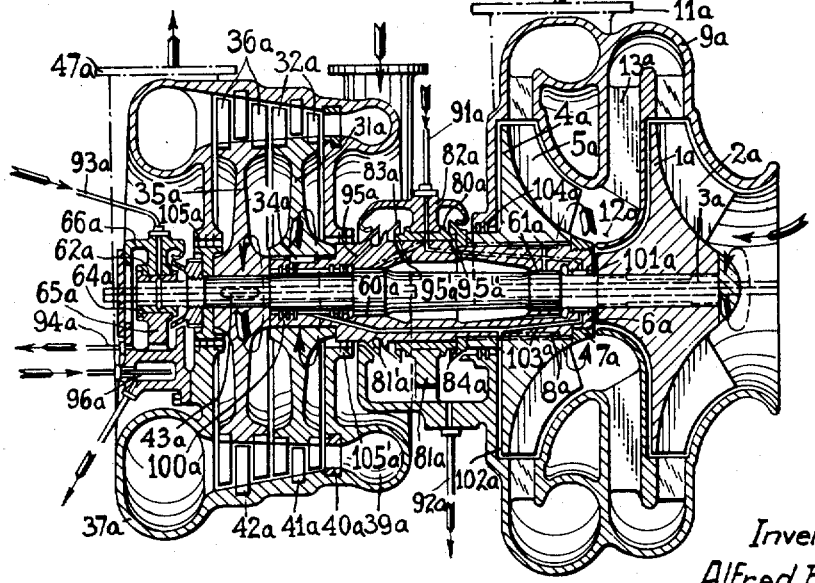
Figure 2 is an axial section through an embodiment wherein two oppositely running radial impeller blower wheels are assumed and in which the turbine is provided with two oppositely running axial rotor wheels each with two stages, wherein there is reversal in the rotary direction between the second and third impeller stage.

In Figure 2 the first blower wheel is marked 1a and the radial vanes 2a. 3a is the inner shaft to which this wheel is keyed. 4a is a second blower wheel which embodies a radial set of vanes 5a. 9a is a two-part blower housing surrounding the rotors, together with the outlet connector 11a. The air delivered by the first radial blower which operates in the opposite direction to the second blower wheel 4a, passes through the reverser passage 12a which can be provided with vanes 13a. The blower wheel 4a is keyed to the outer shaft 6a by the key 8a and secured thereon by the nut 7a.

The turbine consists of a first rotor wheel 31a on which is fitted a two stage axial vane system 32a. This rotor wheel is keyed to the outer shaft 6a by means of a key 34a. 35a is a second rotor which operates in the opposite direction to the rotor wheel 31a. Two axial vane rings 36a are provided on this wheel. 37a is an outlet housing for the turbine and 39a the inlet housing together with its guide vane system 40a. A guide vane ring 41a, 42a is arranged between each of the rotor vane systems 32a and 36a. The turbine rotor wheel 35a is keyed on the inner shaft 3a by means of the key 43a. The bearings 60a and 61a support the inner shaft 3a in the outer shaft 6a. Further this shaft is held both in the radial and axial direction by means of bearing bushes 62a, 64a in two-part bearing housings 65a, 66a. The bearing housing 65a is screwed to the two-part turbine housing 37a, 39a. A one- or two-part bearing bush for the outer shaft 6a is provided at 80a. This bearing bush is mounted in the two part support 81a, 82a. Two oil throw rings 83a, 83'a are located on the turbine side of the bearing bush 80a, the latter ring serving for the inner bearing 60a and on the blower side there is provided a similar throw ring 84a for the bearing 61a, which allows the oil to flow outwardly to the bearing support 81a from which it is evacuated through the pipeway 92a.

The feed of oil to all the bearings 60a, 61a and 80a is effected through the pipeway 91a from which both the bush 80a as also the bearings 60a and 61a are lubricated. The outflow of the oil is effected however through the pipeways 95a, 95'a and 95''a running towards the oil throw rings 83a, 83'a or 84a. 93a is the oil inlet for the outer bearing 62a, 64a and 94a is its outflow. The bearing bush 65a is advantageously also provided with a cooling space 96a since it is screwed to the hot turbine housing 37a. Labyrinth packings 100a and 101a are provided which effect the sealing between the two oppositely running shafts. Seal-off air, for example from the blower, is advantageously introduced into these packings through the passage 102a and the bores 103a in the shaft 6a. The blower housing is sealed towards the outside by reason of the labyrinth packing 104a and the turbine housing is sealed by the labyrinth packings 105a and 105'a.

In the construction according to Figure 3 there is again provided a rotor wheel 1b on the inner shaft 3b similarly to Figure 2 together with a set of radial vanes 2b. An axial rotor wheel 2'b is however located in advance of this radial vane system. Also, as according to Figure 2, a second vane wheel 4b is provided which carries a radial set of vanes 5b which is keyed to the outer shaft 6b by means of the key 8b and secured by the nut 7b. Between these two radial wheels 1b and 4b there is however also provided an axial vane wheel 14b which is rigidly connected to the impeller wheel 1b. This axial impeller wheel runs however in the opposite direction to the impeller wheel 4b. The air delivered by the blower wheel 1b in its path to the axial impeller wheel 14b, reaches a cooling space 15b which is provided with a cooling pipe system 15'b. Thus cooling of the delivered air is obtained before it reaches the axial wheel 14b.

The two-part blower housing surrounding the rotor wheels are shown at 9b and 10b. The radial turbine is of the outward flow type and comprises an inner rotor wheel 31b which is provided with two radial vane rings 32'b and 32b. Further two guide vane rings 45b and 46b for this rotor are secured to the turbine housing 37b. The rotor wheel 35b is secured to the outer shaft 6b and is provided with a radial vane system 36b. The turbine housing 37b is closed by a two-part housing cover 38b. The inner turbine wheel 31b is screwed to the inner shaft 3b and held thereto. The outer turbine wheel 35b is however secured to the outer shaft 6b by means of the screws 50b. The mounting of the inner and outer shafts is effected in this case similarly to the arrangement shown in Figure 1 but all three blower wheels 2'b, 1b and 14b are fitted in the same manner to the inner shaft 3b as is effected in the case of the radial wheel 1 of Figure 1. Also the outer bearing 62b to 67b is constructed in the same way as in Figure 1, as also is the oil feed and evacuation. The same applies for the labyrinth packings and the introduction of seal-off air. In Figure 3, however, these elements have the same reference number followed by a "b." 12b indicates a reverser passage provided with vanes 13b.

Figure 4 shows a modification in relation to the construction of the bearings and in this case freely rotating rings 60'c and 61'c and 80c are interposed about the inner bearing points 60c and 61c and likewise within the large bearing 80c, 84c on the outer shaft 6c. By means of the interposition of freely rotatably relatively thin and preferably hardened rings, there is obtained a small peripheral speed at the bearing surfaces and thereby also a small frictional loss. If for example the friction forces are approximately the same at the inside and outside of these free sleeves the latter remain approximately stationary in operation. The relative speed at the bearing surfaces is however only half as great as when both shafts run in opposite directions one against the other. Further only about half as much frictional energy is lost at the two friction surfaces produced. These free rings must however be so constructed that the lubricating oil can reach all the frictional surfaces. They must also be so constructed or assembled that they are held against axial displacement which is effected in the simplest manner as shown in Figure 4 by the fact that an inwardly directed bearing 60c or an outwardly projecting flange or projection bearing 61c is provided.

The free bearing bush 80'c will reach approximately half the peripheral speed that the shaft 6c has in its bearing 80c. The bush 80'c is held by its two projections in the bearing 80c. The elements 1c, 2c, 2'c, 3c, 4c, 5c, 8c, 14c, 31c, 32'c, 32c, and 35c correspond with the similarly numbered elements in Figure 3 having the suffix "b."

Figure 5 shows two sections through a machine assembly according to Figure 3 or 4. The upper half is a section on the line I—I of Figure 4 and the lower half is a section on the line II—II of Figure 3. In the upper half there will be seen the inner shaft 3c with the oil inlet 91c. Around this is disposed the ring 60'c which moves freely in the outer shaft 6c and about the inner shaft 3c. Outside the outer shaft 6c is a free ring 80'c and around the latter is the two-part stationary bearing bush 80c. 82c is the bearing cover which is secured to the lower bearing support 81c by the screws 85c.

In the lower half section will be seen internally a section through the guide vane system 45b, then through the rotor blade system 32'b. Then a section through the guide vane system 46b, then a section through the rotor vane system 32b and then follows the outermost section, that is through the rotor vane system 36b running in the opposite direction to 32b. 47b is the outlet connection from the turbine. 48b represents feet on which the turbine housing 37b rests. The rotor vane system 36b has a greater entrance angle than the rotor vane system 32b as shown in Figure 5.

Figure 6 shows a construction wherein a three-stage axial blower with the rotor wheels 1d, 1'd and 1''d is keyed to the inner shaft 3d, and which embodies axial vane systems 2d, 2'd and 2''d. In front of the axial vane elements 2d, 2'd, 2''d a guide vane device 16d, 16'd and 16''d is provided in each case in the two-part blower housing 9d. Further a rotor wheel 4d is keyed to the outer shaft 6d by means of the key 8d and carries a radial vane system 5d. The pressure medium flows from this vane system into the housing 9d and towards the outlet connector 11d. The turbine is constructed as a radial inward flow turbine. The pressure medium flows from the inlet connector 39d through the guide vane system 40d to the radial vane system 32d of the outer rotor 31d, thence to the oppositely running radial vane system 36d of the inner rotor wheel 35d and thence through to a guide vane system 36'd which is fixed to the turbine housing 37d and thereafter to a rotor wheel vane system 32'd which is arranged on the inner rotor wheel 35d. The inner rotor wheel 35d is keyed to the inner shaft 3d by means of a key 34d. The outer rotor wheel 31d is moreover fixed to the outer shaft 6d by means of screws 50d. The outflow of the gases is effected through the connector 47d. In the example shown the inner shaft 3d is extended on the outflow side of the turbine and passes through the outer radial-axial bearing 65d, 66d. This bearing rests on supports 67d which is connected with the base plate 48d of the machine. The end of the shaft 3d carries a coupling 68d by means of which power can be delivered for example to an electric generator or to other machines or can be used for additional driving of the assembly, for example for starting or additional operation of the group. The other bearings for the inner shaft 3d as well as for the outer shaft 6d and also the means for the introduction and withdrawal of the lubricating oil or the introduction of seal-off air can also be disposed in like manner to that already described for the embodiments according to Figures 1 to 4.

In Figure 7 a similar construction is shown in regard to the blower as in Figure 6 but the incoming axial blower embodies only two rotor vane elements 2e and 2'e and two guide vane elements 16e and 16'e located in front thereof respectively. The two rotor vane systems 2e and 2'e are arranged on a rotor hub 1e which in turn is keyed to the inner shaft 3e. The guide vanes 16e and 16'e are mounted in the two-part blower housing 9e. 4e is a rotor wheel with a radial vane system 5e which is secured to the outer shaft 6e, by means of the key 8e and the nut 7e. The blower housing 9e has a cover 10e in which 11e represents the outlet connections for the blower.

Axial turbines are provided for the turbine system, the pressure medium reaches the inlet housing 39e and passes through the guide vanes 40e into the turbine rotor vane system 32e which is arranged on the rotor wheel 31e. This rotor is keyed to the outer shaft 6e by means of the key 34e. The driving medium passes from the rotor wheel 32e to the rotor vane system 36e. The latter is arranged on the rotor disc 35e which is connected to the inner shaft 3e by means of the key 43e and secured thereon by the nut 49e. The wheel 35e runs oppositely to the wheel 31e. 37e is the outlet housing for the turbine and 47e the outlet connections thereof. At the turbine side the shaft 3e has, as in Figure 6, an extension which is however supported in a ball bearing 62e which may also be arranged to absorb thrust forces and which is carried in a bearing support 65e. The shaft 3e carries at its end a coupling 68e by which a machine can be driven or by which the assembly may receive additional energy from the outside. At the right hand end of the shaft 3e a coupling 68'e is also provided. 48e is the base plate of the machine on which the bearing support 65e and the turbine as well as the blower housings are arranged. The arrangement of the other bearings 60e, 61e, 80e is similarly constructed as in the other constructional examples described and the same applies to the introduction and withdrawal of the lubricating medium to these bearings. By these means the introduction of the lubricating medium is effected mainly only through the center bearing 80e which surrounds the outer shaft 6 and also to the inner bearings 60e and 61e. Also the introduction of seal-off air to the labyrinth packings along the inner shaft 3e is arranged as already described. The same applies to the labyrinth packings between the two shafts and between the outer shaft 6e and the blower and the turbine housing. Also a labyrinth packing 105e is also provided on the exhaust side of the turbine which likewise receives pressure air from the blower housing 9 for example, through the pipe 106e.

In Figure 8 a blower is shown which is formed in the initial section as an axial blower and for the second section as a radial blower. The delivered medium flows through a guide wheel 16f to a first axial wheel 20f which is releasably fitted to a drum 21f by means of an external thread, which drum is screwed at its axial ends to the cover disc 22f of the radial wheel 4f with the radial vane system 5f. The vanes are fitted to the outer ring section provided with a thread. Also the axial wheel 20f can likewise be fitted with a strengthening ring 24f at the inner diameter, in which the vanes 20f can be inserted. The next wheel in the direction of flow is again an axial wheel 2f which is keyed by its hub on the inner shaft 3f. Thereafter follows a rotor impeller wheel 20'f which is secured on the outside in the ring 21f and comprises internally a strengthening ring 24'f. Further a second wheel 2'f is provided in the flow direction and is mounted on the inner shaft 3f; the radial rotor wheel 4f is arranged on the outer shaft 6f which is produced at least partially integrally with the wheel 4f. The turbine is arranged as a single-stage oppositely running radial-axial turbine. 31f is the first rotor wheel having a rotor blade system 32f. This receives pressure medium from the inlet housing 39f through the guide vane system 40f. The hub of the rotor wheel 31f is screwed to the outer shaft 6f by means of an extension provided with a thread so that the impeller wheel 4f, its cover ring 22f and the extension ring 21f screwed thereto rotate together with the axial vane systems 20f and 20'f secured thereto. 35f is the second turbine wheel with its axial-radial vane system 36f. This wheel is keyed to the inner shaft 3f by means of a key 43f and secured by means of a nut 49f.

After the outflow of the gases from the vane system 36f, these flow into the outlet housing 37f of the turbine and thence to the outlet connection 47f. The supporting of the inner shaft 3f is effected on the one hand by the two-part bearing 65f, 66f which, similarly to the same bearing according to Figure 1, is arranged as a thrust bearing for retaining the shaft 3f in the axial direction. The support for this bearing is shown at 67f and is connected with the blower housing 9f. The outlet connection for the blower is marked 11f. Further the inner shaft 3f is held at the other end also at the outside by a bearing 65'f, 66'f. The outer shaft 6f is held only on the inner shaft 3f by two bearings 60f, 61f. These two bearings are constructed as shown in Figure 4 that is free bearing bushes 60'f and 61'f, hardened inside and outside are arranged around the inner shaft 3f and can rotate freely both around the inner shaft and also within the outer shaft 6f.

In the case of Figure 8 a sleeve 60''f or 61''f is fixed to the shaft 3f in each case between the shaft 3f and these free rings. For this purpose pressed-on sleeve with hardened outer surfaces are for example used. A distance sleeve is also provided on the shaft 3f between the sleeves 60''f and 61''f and also between the sleeve 61''f and the axial wheel 2'f. In the case of Figure 4 it is however assumed that the free sleeves 60'c and 61c are provided with bearing metal and the shafts 3c and 6c embody hard outer surfaces at the bearing points. In all cases the hardness or running properties of the bearing must be chosen relatively to ensure satisfactory operation. The feed of oil to the bearings 60f and 61f is effected in the same manner as shown in Figure 1 that is through the inner shaft 3f. The bearings 65f, 66f or 65'f, 66'f are lubricated from the outside as is also shown in Fig. 1. The evacuation of the lubricating oil is effected from the center of the machine through bores 95f in the shaft 6f and through the hub of the turbine wheel 31f to an oil collecting housing 96f, arranged in the center of the machine and outwardly through the pipeway 92f. Labyrinth packings are provided as already shown diagrammatically between the inner and outer shafts also between the blower wheels and housings as well as between turbine wheels and housings. The introduction of seal-off air to the labyrinth 100f in front of the bearing 60f is effected through a pipeway 106f from the blower housing 9f and through a bore 107f through the inner shaft 3f.

In Figure 9 a construction is shown wherein the blower as well as the turbine are all of similar construction to that shown in Figure 7. However, the bearing for the inner shaft 3g as well as for the outer shaft 6g is arranged quite differently. The inner shaft 3g is supported at both ends outside the machine by the bearings 65g, 66g and 65'g and 66'g respectively. However, the outer shaft 6g on which the overhung blower vane wheel 4g, 5g and the axial also overhung turbine wheel 31g with its vane system 32g are fastened, is located outwardly by two adjacently arranged bearings 81'g and 81''g means of the bearing bushes 80'g and 80''g. There is thus no contact through bearings as in the other constructional embodiments between the oppositely running shafts 3g and 6g. Between these shafts only labyrinth packings 100g, 101g are arranged at the ends of the shaft 6g for at least partially hindering the flow of air from the blower to the space between the two turbine wheels. Seal-off air can also be introduced to this labyrinth for example through the space 102g from the blower through bores 103g in the outer shaft. The other elements shown correspond with elements previously described with reference particularly to Figures 7 and 8. In the following claims it is understood that when a blower rotor is referred to this term also comprises a pump rotor.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A multi-stage counter rotating gas turbine driven vane wheel compressor or pump, comprising a high and low pressure vane wheel of at least one stage each, counter-rotating high and low pressure axially through flow turbine rotors of *at least* one stage each, a stator housing for the turbine comprising guide ducts to guide the actuating gas from a source outside to the high and low pressure turbine rotors and to guide the discharge of the gas to the outside, a stator housing for the compressor comprising a guide device to transform the velocity of the pressure fluid at least partly into pressure and to guide it to the outside, both said housings being mounted on a common floor base, coaxial inner and outer shafts extending centrally and longitudinally with respect to said housings, each of said shafts being secured at one end thereof to one of said compressor vane wheels and each of said turbine rotors being secured to the other ends of said shafts, said shafts being driven by said turbine rotors in mutually opposite direction, blading on each vane wheel constituting a blading assembly of at least two stages receiving the pressure medium in axial direction by rotation of said low pressure vane wheel having blading constructed for rotation in one direction and feeding it directly and centrally over substantially equally dimensioned through flow areas into said high pressure compressor vane wheel and being discharged from the latter in radial direction and supplied to said guide device of the compressor housing, said high pressure turbine rotor being bladed to rotate at greater rotational speed and power consumption than said low pressure turbine rotor and rotating one of said two compressor vane wheels at greater rotational speed than the other of said two vane wheels, whereby optimum efficiency of the compressor at under-rated quantity and pressure of the available actuating medium for said turbine is attained.

2. A multi-stage counter rotating gas turbine driven vane wheel compressor or pump, comprising a high and low pressure vane wheel of at least one stage each, counter-rotating high and low pressure axially through flow turbine rotors of *at least* one stage each, a stator housing for the turbine comprising guide ducts to guide the actuating gas from a source outside to the high and low pressure turbine rotors and to guide the discharge of the gas to the outside, a stator housing for the compressor comprising a guide device to transform the velocity of the pressure fluid at least partly into pressure and to guide it to the outside, both said housings being mounted on a common floor base, coaxial inner and outer shafts extending centrally and longitudinally with respect to said housings, each of said shafts secured on one end thereof to one of said compressor vane wheels and each of said turbine rotors secured to the other ends of said shafts, said shafts being driven by said turbine rotors in mutual opposite direction, the high pressure turbine rotor and the high pressure compressor vane wheel being connected to the outer shaft of said two coaxial shafts, the low pressure turbine rotor and the low pressure compressor vane wheel being connected to the inner shaft, blading on each vane wheel constituting a blading assembly of at least two stages receiving the pressure medium in axial direction by rotation of said low pressure vane wheel having blading constructed for rotation in one direction and feeding it directly and centrally into said high pressure compressor vane wheel and being discharged from the latter in radial direction and supplied to said guide device of the compressor housing, said high and low pressure turbine rotor being bladed for rotation in mutually opposite directions, said high pressure turbine rotor being bladed to rotate at greater rotational speed and power consumption than said low pressure turbine rotor and rotating one of said two compressor vane wheels at greater rotational speed than the other of said two vane wheels, whereby optimum efficiency of the compressor at under-rated quantity and pressure of the available actuating medium for said turbine is attained.

3. A multi-stage counter rotating gas turbine driven vane wheel compressor or pump, comprising a high and low pressure vane wheel of at least one stage each counter-rotating high and low pressure axially through flow turbine rotors of one stage each, a stator housing for the turbine comprising guide ducts to guide the actuating gas from a source outside to the high and low pressure turbine rotors and to guide the discharge of the gas to the outside, a stator housing for the compressor comprising a guide device to transform the velocity of the pressure fluid at least partly into pressure and to guide it to the outside, both said housings being mounted on a common floor base, coaxial inner and outer shafts extending centrally and longitudinally with respect to said housings, each of said shafts being secured on one end thereof to one of said compressor vane wheels and each of said turbine rotors being secured to the other ends of said shafts, said shafts being driven by said turbine rotors in mutually opposite direction, the high pressure turbine rotor and the high pressure compressor vane wheel being connected to the outer shaft of said two coaxial shafts, the low pressure turbine rotor and the low pressure compressor vane wheel being connected to the inner shaft, a bearing arrangement for said inner and outer shafts, both ends of the inner shaft projecting beyond said housings and being supported by slide bearings mounted on a pedestal fastened to said common base, the outer shaft of said coaxial shafts being supported by means of counter rotating slide bearings upon said inner shaft, said counter rotating slide bearings neighboring on one side the high pressure turbine rotor and on the other side the high pressure compressor vane wheel blading, to reduce the length of said coaxial shafts and the overall length from one outer end to the other outer end of said housings, and to provide for smooth running of said shaft.

4. A turbine driven multi-stage compressor or pump according to claim 3, wherein idler, freely movable bearing bushes are interposed at the counter rotating bearing points between the two oppositely running shafts in order to reduce the bearing speed.

5. A multi-stage counter rotating gas turbine driven vane wheel compressor or pump, comprising a high and low pressure vane wheel of at least one stage each, counter-rotating high and low pressure axially through flow turbine rotors of *at least* one stage each, a stator housing for the turbine comprising guide ducts to guide the actuating gas from a source outside to the high and low pressure turbine rotors and to guide the discharge of the gas to the outside, a stator housing for the compressor comprising a guide device to transform the velocity of the pressurre fluid at least partly into pressure and to guide it to the outside, both said housings being mounted on a common floor base, coaxial inner and outer shafts extending centrally and longitudinally with respect to said housings, each of said shafts being secured at one end thereof to one *of* said compressor vane wheels and each of said turbine rotors being secured to the other [ends] *end* of said shafts, said shafts being driven by said turbine rotors in mutually opposite directions, blading on each compressor vane wheel constituting a blading assembly of at least two stages receiving the pressure medium in axial direction by rotation of said low pressure vane wheel, said blading assembly including centrifugal blading for the high pressure compressor vane wheel and being operatively connected to the outer shaft, an outer cover plate for said centrifugal blading, said cover plate being integrally formed with a drumlike extension, inner threading for said drum, an axially through [flown] *flow* blade-ring having outer threading, said blade-ring being screwed into said outer cover plate, a second outer drum like extension integral with said blade-ring having an inner threading, and a second axially through [flown] *flow* blade-ring having outer threading and being screwed into said second extension, said first mentioned blade-ring being spaced from said centrifugal blading, and said second blade-ring being spaced from said first blade-ring between said centrifugal blading and said first blade-ring and between said first mentioned and said second blade-ring, counter rotating blade wheels mounted on said inner shaft, said high and low pressure turbine rotors being bladed for rotation in mutually opposite directions, said high pressure turbine rotor being bladed to rotate at greater rotational speed and power consumption than said low pressure turbine rotor and rotating one of said two compressor vane wheels at greater rotational speed than the other of said two vane wheels [,whereby optimum efficiency of the compressor at under-rated quantity and pressure of the available actuating medium for said turbine is attained].

6. A turbine driven multi-stage compressor or pump according to claim 5, wherein the axial flow vane wheel blading ring fitted to the drum extends by its blading towards the hub of the counter rotating axially traversed compressor or pump vane wheel and the free ends of said blading are connected to an annular ring surrounding said hub.

*7. A multi-stage counter rotating gas turbine driven vane wheel compressor or pump, comprising a high and low pressure vane wheel of at least one stage each, counter rotating high and low pressure turbine rotors of at least one stage each, a stator housing for the turbine comprising guide ducts to guide the actuating gas from a source outside to the high and low pressure turbine rotors and to guide the discharge of the gas to the outside, a stator housing for the compressor comprising a guide device to transform the velocity of the pressure fluid at least partly into pressure and to guide it to the outside, both said housings being mounted on a common floor base, coaxial inner and outer shafts extending centrally and longitudinally with respect to said housings, each of said shafts being secured at one end thereof to one of said compressor vane wheels and each of said turbine rotors being secured to the other ends of said shafts, said shafts being driven by said turbine rotors in mutually opposite direction, blading on each vane wheel constituting a blading assembly of at least two stages receiving the pressure medium in axial direction by rotation of said low pressure vane wheel having blading contructed for rotation in one direction and feeding it directly and centrally over substantially equally dimensioned through flow areas into said high pressure compressor vane wheel and being discharged from the latter in radial direction and supplied to said guide device of the compressor housing, said high pressure turbine rotor being bladed to rotate at greater rotational speed and power consumption than said low pressure turbine rotor and rotating one of said two compressor vane wheels at greater rotational speed than the other of said two vane wheels, whereby optimum efficiency of the compressor at under-rated quantity and pressure of the available actuating medium for said turbine is attained.*

*8. A multi-stage counter rotating gas turbine driven vane wheel compressor or pump, comprising a high and low pressure vane wheel of at least one stage each, counter rotating high and low pressure turbine rotors of at least one stage each, a stator housing for the turbine comprising guide ducts to guide the actuating gas from a source outside to the high and low pressure turbine rotors and to guide the discharge of the gas to the outside, a stator housing for the compressor comprising a guide device to transform the velocity of the pressure fluid at least partly into pressure and to guide it to the outside, both said housings being mounted on a common floor base, coaxial inner and outer shafts extending centrally and longitudinally with respect to said housings, each of said shafts being secured on one end thereof to one of said compressor vane wheels and each of said turbine rotors being secured to the other ends of said shafts, said shafts being driven by said turbine rotors in mutually opposite direction, the high pressure turbine rotor and the high pressure compressor vane wheel being connected to the outer shaft of said two coaxial shafts, the low pressure turbine rotor and the low pressure compressor vane wheel being connected to the inner shaft, a bearing arrangement for said inner and outer shafts, both ends of the inner shaft projecting beyond said housings and being supported by slide bearings mounted on a pedestal fastened to said common base, the outer shaft of said coaxial shafts being supported by means of counter rotating slide bearings upon said inner shaft, said counter rotating slide bearings neighboring on one side the high pressure turbine rotor and on the other side the high pressure compressor vane wheel blading, to reduce the length of said coaxial shafts and the overall length from one outer end to the other*

*outer end of said housings, and to provide for smooth running of said shaft.*

*9. A turbine driven multi-stage compressor or pump, according to claim 8, wherein idler, freely movable bearing bushes are interposed at the counter rotating bearing points between the two oppositely running shafts in order to reduce the bearing speed.*

*10. A multi-stage counter rotating gas turbine driven vane wheel compressor or pump, comprising a high and low pressure vane wheel of at least one stage each, counter rotating high and low pressure turbine rotors of at least one stage each, a stator housing for the turbine comprising guide ducts to guide the actuating gas from a source outside to the high and low pressure turbine rotors and to guide the discharge of the gas to the outside, a stator housing for the compressor comprising a guide device to transform the velocity of the pressure fluid at least partly into pressure and to guide it to the outside, both said housings being mounted on a common floor base, coaxial inner and outer shafts extending centrally and longitudinally with respect to said housings, each of said shafts being secured at one end thereof to one of said compressor vane wheels and each of said turbine rotors being secured to the other end of said shafts, said shafts being driven by said turbine rotors in mutually opposite directions, blading on each compressor vane wheel constituting a blading assembly of at least two stages receiving the pressure medium in axial direction by rotation of said low pressure vane wheel, said blading assembly including centrifugal blading for the high pressure compressor vane wheel and being operatively connected to the outer shaft, an outer cover plate for said centrifugal blading, said cover plate being integrally formed with a drumlike extension, inner threading for said drum, an axially through flow blade-ring having outer threading, said blade-ring being screwed into said outer cover plate, a second outer drum like extension integral with said blade-ring having an inner threading, and a second axially through flow blade-ring having outer threading and being screwed into said second extension, said first mentioned blade-ring being spaced from said centrifugal blading, and said second blade-ring being spaced from said first blade-ring between said centrifugal blading and said first blade-ring and between said first mentioned and said second blade-ring, counter rotating blade wheels mounted on said inner shaft, said high and low pressure turbine rotors being bladed for rotation in mutually opposite directions, said high pressure turbine rotor being bladed to rotate at greater rotational speed and power consumption than said low pressure turbine rotor and rotating one of said two compressor vane wheels at greater rotational speed than the other of said two vane wheels, whereby optimum efficiency of the compressor at underrated quantity and pressure of the available actuating medium for said turbine is attained.*

*11. A turbine driven multi-stage compressor or pump according to claim 10, wherein the axial flow vane wheel blading ring fitted to the drum extends by its blading towards the hub of the counter rotating axially traversed compressor or pump vane wheel and the free ends of said blading are connected to an annular ring surrounding said hub.*

*12. A multi-stage counter rotating gas turbine driven vane wheel compressor or pump, comprising a high and low pressure vane wheel of at least one stage each, counter rotating high and low pressure radially through flow turbine rotors of at least one stage each, a stator housing for the turbine comprising guide ducts to guide the actuating gas from a source outside to the high and low pressure turbine rotors and to guide the discharge of the gas to the outside, a stator housing for the compressor comprising a guide device to transform the velocity of the pressure fluid at least partly into pressure and to guide it to the outside, both said housings being mounted on a common floor base, coaxial inner and outer shafts extending centrally and longitudinally with respect to said housings, each of said shafts being secured at one end thereof to one of said compressor vane wheels and each of said turbine rotors being secured to the other ends of said shafts, said shafts being driven by said turbine rotors in mutually opposite direction, blading on each vane wheel constituting a blading assembly of at least two stages receiving the pressure medium in axial direction by rotation of said low pressure vane wheel having blading constructed for rotation in one direction and feeding it directly and centrally over substantially equally dimensioned through flow areas into said high pressure compressor vane wheel and being discharged from the latter in radial direction and supplied to said guide device of the compressor housing, said high pressure turbine rotor being bladed to rotate at greater rotational speed and power consumption than said low pressure turbine rotor and rotating one of said two compressor vane wheels at greater rotational speed than the other of said two vane wheels, whereby optimum efficiency of the compressor at under-rated quantity and pressure of the available actuating medium for said turbine is attained.*

*13. A multi-stage counter rotating gas turbine driven vane wheel compressor or pump, comprising a high and low pressure vane wheel of at least one stage each, counter rotating high and low pressure radially through flow turbine rotors of at least one stage each, a stator housing for the turbine comprising guide ducts to guide the actuating gas from a source outside to the high and low pressure turbine rotors and to guide the discharge of the gas to the outside, a stator housing for the compressor comprising a guide device to transform the velocity of the pressure fluid at least partly into pressure and to guide it to the outside, both said housings being mounted on a common floor base, coaxial inner and outer shafts extending centrally and longitudinally with respect to said housings, each of said shafts secured on one end thereof to one of said compressor vane wheels and each of said turbine rotors secured to the other ends of said shafts, said shafts being driven by said turbine rotors in mutual opposite direction, the high pressure turbine rotor and the high pressure compressor vane wheel being connected to the outer shaft of said two coaxial shafts, the low pressure turbine rotor and the low pressure compressor vane wheel being connected to the inner shaft, blading on each vane wheel constituting a blading assembly of at least two stages receiving the pressure medium in axial direction by rotation of said low pressure vane wheel having blading constructed for rotation in one direction and feeding it directly and centrally into said high pressure compressor vane wheel and being discharged from the latter in radial direction and supplied to said guide device of the compressor housing, said high and low pressure turbine rotor being bladed for rotation in mutually opposite directions, said high pressure turbine rotor being bladed to rotate at greater rotational speed and power consumption than said low pressure turbine rotor and rotating one of said two compressor vane wheels at greater rotational speed than the other of said two vane wheels, whereby optimum efficiency of the compressor at under-rated quantity and pressure of the available actuating medium for said turbine is attained.*

*14. A multi-stage counter rotating gas turbine driven vane wheel compressor or pump, comprising a high and low pressure vane wheel of at least one stage each, counter rotating high and low pressure radially through flow turbine rotors of at least one stage each, a stator housing for the turbine comprising guide ducts to guide the actuating gas from a source outside to the high and low pressure turbine rotors and to guide the discharge of the gas to the outside, a stator housing for the compressor comprising a guide device to transform the velocity of the pressure fluid at least partly into pressure and to guide it to the outside, both said housings being mounted on a*

*common floor base, coaxial inner and outer shafts extending centrally and longitudinally with respect to said housings, each of said shafts being secured on one end thereof to one of said compressor vane wheels and each of said turbine rotors being secured to the other ends of said shafts, said shafts being driven by said turbine rotors in mutually opposite direction, the high pressure turbine rotor and the high pressure compressor vane wheel being connected to the outer shaft of said two coaxial shafts, the low pressure turbine rotor and the low pressure compressor vane wheel being connected to the inner shaft, a bearing arrangement for said inner and outer shafts, both ends of the inner shaft projecting beyond said housings and being supported by slide bearings mounted on a pedestal fastened to said common base, the outer shaft*

*of said coaxial shafts being supported by means of counter rotating slide bearings upon said inner shaft, said counter rotating slide bearings neighboring on one side the high pressure turbine rotor and on the other side the high pressure compressor vane wheel blading.*

References Cited in the file of this patent or the original patent

UNITED STATES PATENTS

| | | |
|---|---|---|
| 2,575,682 | Price | Nov. 20, 1951 |
| 2,611,532 | Ljungstrom | Sept. 23, 1952 |
| 2,625,790 | Petrie | Jan. 20, 1953 |
| 2,659,529 | Price | Nov. 17, 1953 |
| 2,726,508 | Halford et al. | Dec. 13, 1955 |